No. 688,225. Patented Dec. 3, 1901.
F. W. BROOKS.
SEAL.
(Application filed Mar. 12, 1901.)
(No Model.)
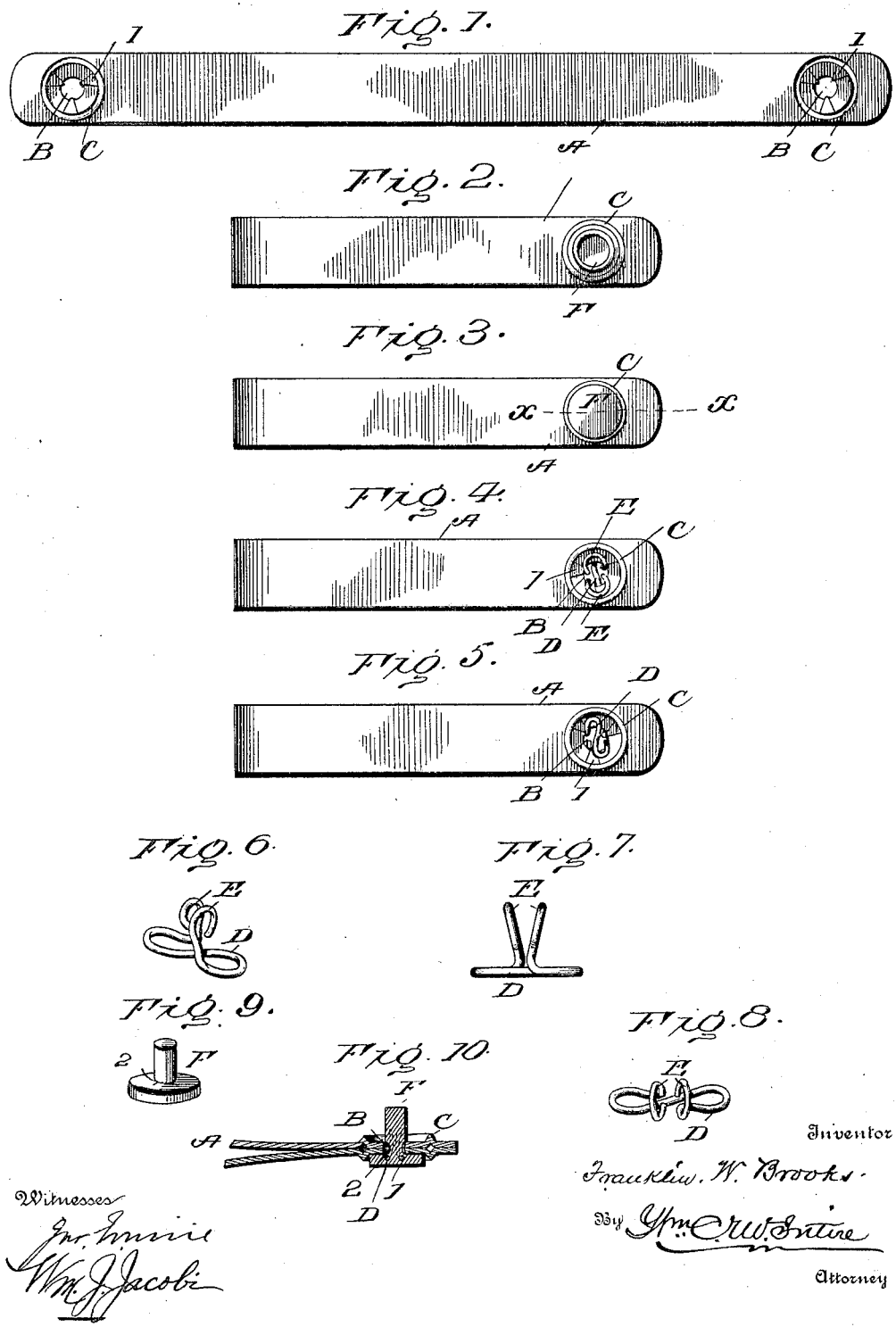
Inventor
Franklin W. Brooks
By Wm C. McIntire
Attorney
Witnesses

UNITED STATES PATENT OFFICE.

FRANKLIN W. BROOKS, OF WASHINGTON, DISTRICT OF COLUMBIA, ASSIGNOR TO GRANT MANUFACTURING COMPANY, A CORPORATION OF VIRGINIA.

SEAL.

SPECIFICATION forming part of Letters Patent No. 688,225, dated December 3, 1901.

Application filed March 12, 1901. Serial No. 50,836. (No model.)

*To all whom it may concern:*

Be it known that I, FRANKLIN W. BROOKS, a citizen of the United States, residing at Washington, in the District of Columbia, have invented certain new and useful Improvements in Seals; and I do hereby declare the following to be a full, clear, and exact description of the invention, such as will enable others skilled in the art to which it appertains to make and use the same.

My invention relates to certain new and useful improvements in metallic seals, and particularly to that class in which the shackle is composed of a strip of thin sheet metal secured at the ends by a soft-metal rivet.

My invention has for its object to so construct the sheet-metal shackle and the securing soft-metal rivet that when the latter is compressed to fasten the ends of the shackle together it will be impossible to remove the rivet to release the ends of the shackle without manifesting such attempt.

With these ends in view my invention consists of a shackle composed of thin sheet metal provided at both of its ends with an orifice or opening to receive the shank of a soft-metal rivet and a soft-metal rivet having embedded within its head and shank a wire body having a radially-extended head located within the head of the rivet and a duplex shank located within the shank of the rivet and capable of lateral movement under the action of compressing-dies, so that when the rivet has been properly located with reference to the ends of the shackle and duly compressed between compressing-dies the radially-extended head of the incorporated wire body will bridge and extend beyond the boundaries of the rivet-orifice in one of the ends of the shackle and the duplex shank of the wire body will be spread and flattened out to bridge and extend beyond the boundaries of the rivet-orifice in the opposite end of the shackle, thus permanently and securely locking the two ends of the shackle together by the combined action of the soft-metal rivet and its incorporated wire body, as will be hereinafter more fully explained.

My invention further consists in forming the sheet-metal shackle with an embossment surrounding the rivet-orifice, so that any effort made to raise the flattened or compressed faces of said rivet will tend to deface such embossment and make manifest such attempt.

My invention further consists in providing the sheet-metal shackle with a series of flexible tongues or spurs at predetermined localities surrounding the rivet-orifice, and in forming the rivet with a circumferential groove near the juncture between the stem and head adapted to receive the end of the spurs, whereby the proper relation between the ends of the shackle and the rivet may be established and maintained prior to the compression of the rivet by the seal-press.

In order that those skilled in the art to which my invention appertains may know how to make and use my improved seals, I will proceed to describe the construction thereof and the manner of using the same, referring by characters to the accompanying drawings, in which—

Figure 1 is a plan view of the outside face of the sheet-metal shackle. Fig. 2 is a similar view of the shackle, with its ends secured by one of my improved rivets and showing an embossment surrounding the compressed rivet. Fig. 3 is a view similar to Fig. 2, but showing the opposite side or head of the rivet. Fig. 4 is a view similar to Fig. 2, with the soft-metal portion of the rivet removed (by meeting) and exposing the shank of the wire core as it appears after compression of the rivet. Fig. 5 is a view similar to Fig. 3 and with the soft metal of the rivet similarly removed and exposing the head of the wire body. Fig. 6 is a perspective view, on an enlarged scale, of the wire body incorporated within the soft metal of the rivet. Fig. 7 is a side elevation of the wire body shown at Fig. 6 and showing the two portions of the shank thereof diverging from one another. Fig. 8 is a top or plan view of said wire body. Fig. 9 is a perspective view of the rivet before compression and with the wire core or body concealed therein, and Fig. 10 is a section on line $x\ x$ of Fig. 3 before compression of the rivet.

Similar characters of reference indicate like parts in the several figures of the drawings.

A is a shackle composed of thin sheet metal, such as ordinary tin, and which may have any suitable characters, words, or numerals produced thereon in any well-known manner to indicate origin and ownership. The opposite ends of the shackle A are perforated or punched, as illustrated at B, to produce openings for the passage therethrough of the shank of the fastening-rivet, and one or both of said openings are surrounded by an embossment C, sufficiently distant from said opening to receive within its boundaries the head or shank, or both, of the metal rivet when it has been duly flattened or compressed under the action of dies in a hand sealing-press.

At predetermined localities there are formed a series of radially-disposed spurs or tongues 1, projecting a very slight distance within the rivet-orifice and separated by a kerf from the metal each side for such distance as may be necessary to give to said spurs or tongue a springing capability and adapted to enter a groove in a soft-metal rivet, as will be presently explained.

The wire body or core is made of a single piece bent, as clearly shown at Fig. 6, to constitute a head portion D and two shank portions E, the latter diverging from one another to such extent as to insure their outward and downward movement under the pressure of the compressing-dies of the sealing-press to assume the condition shown at Fig. 4.

F is the rivet as it appears covering and concealing the incorporated wire body or core, and when compressed to lock together the ends of the sheet-metal shackle, as shown at Figs. 2 and 3, there is no indication of the presence within it of such wire core or body, and the relation between the soft metal and the incorporated wire core or body is such that the latter in no wise effects the proper compression of the soft metal or the impression thereon of any desired station marks or characters.

When the rivet has been properly compressed, the ends of the shackle A are not only locked together by the head and expanded shank of the soft-metal portion of the rivet, but the wire core with its head and flattened shank constitute a secondary rivet stiff and non-ductile in character and which will strongly resist any effort to reduce the area of the rivet in order to remove the end of the shackle therefrom.

The stem of the rivet is at the locality adjacent to the head provided with an annular groove 2, adapted to receive the ends of the flexible tongues or spurs 1, formed with the sheet-metal shackle, when the ends of the latter have been located around the stem of the rivet. This relation between the parts holds the ends of the sheet-metal shackle in proper relation with the rivet until the latter has been duly compressed. The embossment surrounding the rivet-orifice in one or both ends of the shackle is intended as an auxiliary guard against any effort to reduce the area of the compressed rivet, and any prying action exerted to raise the head or flattened shank of the wire core or body incorporated in the soft-metal rivet will result in the breaking down or defacement of the embossment, and thus make apparent the fraudulent effort. The wire body or core incorporated within the soft-metal rivet being made of a single piece and bent to constitute a head and shank portions, as described, becomes when acted upon by the compression-dies in the act of sealing an exceedingly strong and effective lock to secure the ends of the shackle together and renders a fraudulent separation of the ends of the shackle practically impossible.

I do not wish to be confined to the presence of the embossment surrounding the rivet openings or orifices in the ends of the sheet-metal shackle, as my improved rivet will be effective in the absence of such embossment; but I prefer in practice to employ such construction as an additional security.

Having described the construction, method of using, and the advantages of my improved seal, what I claim as new, and desire to secure by Letters Patent, is—

1. A seal composed of a sheet-metal shackle formed with rivet-orifices through its opposite ends, and a securing-rivet composed of soft metal and having a head and shank, and having incorporated therein a wire core composed of a head located within the head of the soft-metal rivet, and a duplex shank located within the shank of the rivet, said core adapted to bridge the orifices in the sheet-metal shackle and to lock the ends of the latter together, substantially as hereinbefore set forth.

2. In a seal, the combination with a sheet-metal shackle having at its opposite ends a ring-shaped rib or embossment a predetermined distance from a rivet-orifice lying in a plane below that of the embossment, of a soft-metal securing-rivet expanded beyond the boundaries of the orifices and within the ribs or embossments, substantially as and for the purpose set forth.

3. A securing-rivet for sheet-metal seals, composed of soft metal and having an integral head and shank, and having incorporated therein a wire core having a head located within the head of the soft-metal rivet, and a duplex shank located within the shank of the soft-metal rivet, substantially as and for the purpose set forth.

4. A securing-rivet for sheet-metal shackles, composed of soft metal and having an integral head and shank, and having incorporated therein a core composed of a single piece of wire bent to form a loop-shaped head and a duplex loop-shaped shank, substantially as and for the purpose set forth.

5. A securing-rivet for sheet-metal shackles, composed of an integral head and shank of soft metal, having incorporated therein a core composed of a single piece of wire bent to constitute a loop-shaped head and a loop-shaped duplex shank, the two members of the latter, diverging from the head portion substantially as and for the purpose set forth.

6. In a seal such as described, the sheet-metal shackle A, formed with rivet-orifices B, and spring tongues or spurs I, projecting slightly within the orifices B, in combination with a soft-metal rivet F, formed with a circumferential channel 2, substantially as and for the purpose set forth.

In testimony whereof I affix my signature in presence of two witnesses.

FRANKLIN W. BROOKS.

Witnesses:
  WM. H. BATES,
  D. G. STUART.